United States Patent
Hwang et al.

(10) Patent No.: US 7,532,401 B2
(45) Date of Patent: May 12, 2009

(54) INTEGRATED OPTICAL FILTER APPARATUS

(75) Inventors: Seong-mo Hwang, Seongnam-si (KR); Hong-seok Lee, Seongnam-si (KR); Young-chan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 11/338,829

(22) Filed: Jan. 25, 2006

(65) Prior Publication Data

US 2006/0164741 A1    Jul. 27, 2006

(30) Foreign Application Priority Data

Jan. 26, 2005    (KR) ............... 10-2005-0007241

(51) Int. Cl.
*G02B 27/10* (2006.01)
*G02B 27/14* (2006.01)
(52) U.S. Cl. .................. 359/618; 359/629; 359/634
(58) Field of Classification Search .......... 359/242, 359/495, 496, 586, 589, 590, 618, 629, 634, 359/637, 639, 885; 385/46, 47, 129, 132; 398/79, 85; 356/467, 468; 372/25, 30; 250/330
See application file for complete search history.

(56) References Cited

U.S. PATENT DOCUMENTS

| 4,141,651 | A | * | 2/1979 | Smith et al. | 356/467 |
| 4,449,824 | A | * | 5/1984 | Matthews | 356/467 |
| 5,309,456 | A | * | 5/1994 | Horton | 372/25 |
| 5,452,385 | A | * | 9/1995 | Izumi et al. | 385/37 |
| 5,920,411 | A | * | 7/1999 | Duck et al. | 398/85 |
| 6,075,632 | A | | 6/2000 | Braun | |
| 6,115,178 | A | * | 9/2000 | Naganuma et al. | 359/495 |
| 6,636,658 | B2 | * | 10/2003 | Goodman et al. | 385/24 |
| 6,775,439 | B2 | * | 8/2004 | Takano et al. | 385/47 |

FOREIGN PATENT DOCUMENTS

JP    59-187314 A    10/1984

* cited by examiner

*Primary Examiner*—Loha Ben
(74) *Attorney, Agent, or Firm*—Sughrue Mion, PLLC

(57) ABSTRACT

An integrated optical filter apparatus, which can be used for a miniaturized waveguide and can reduce crosstalk between adjacent signals. The integrated optical filter apparatus includes a first optical filter reflecting a light beam of a first wavelength and transmitting a light beam of a second wavelength from an externally incident light beam, and a second optical filter facing the first optical filter and reflecting the light beam of the first wavelength reflected by the first optical filter to the first optical filter. The light beam of the first wavelength is reflected by the first optical filter at least twice to remove noise within the light beam of the first wavelength.

16 Claims, 6 Drawing Sheets

INTEGRATED OPTICAL FILTER APPARATUS

BACKGROUND OF THE INVENTION

This application claims the priority of Korean Patent Application No. 10-2005-0007241, filed on Jan. 26, 2005, in the Korean Intellectual Property Office, the disclosure of which is incorporated herein in its entirety by reference.

1. Field of the Invention

The present invention relates to an optical filter apparatus, which separates or combines incident light according to wavelengths, and, more particularly, to an integrated optical filter apparatus, which can be used for a miniaturized waveguide and can reduce crosstalk between adjacent signals.

2. Description of the Related Art

In general, optical filters are employed in optical signal transceivers using multiple wavelengths, which separate and receive an optical signal or combine and transmit optical signals via an optical waveguide according to wavelengths. In the meantime, to integrate optical devices with electronic devices and manufacture cheap miniaturized optical devices, studies of silicon-based optical waveguides have recently been conducted. Accordingly, optical filters used together with the silicon-based optical waveguides are required to more efficiently separate a multiple-wavelength signal transmitted via the miniaturized optical waveguides.

Figure 1:
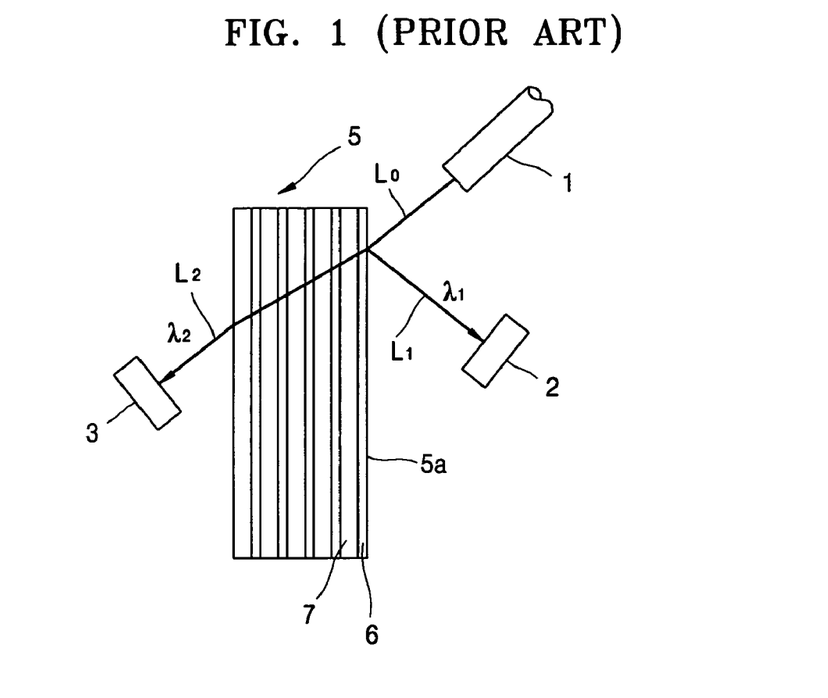
FIG. 1 is a schematic diagram of a conventional optical filter apparatus.

FIG. 1 is a schematic diagram of a conventional optical filter apparatus. Referring to FIG. 1, a conventional optical filter apparatus 5 separates an optical signal beam $L_0$ transmitted via an optical waveguide 1 into first and second light beams $L_1$ and $L_2$ having first and second wavelengths $\lambda_1$ and $\lambda_2$ to be respectively read by a first photo-detector 2 and a second photo-detector 3. That is, the optical filter 5 reflects a component of the first wavelength $\lambda_1$ from the optical signal beam $L_0$ to produce the first light beam $L_1$, and transmits a component of the second wavelength $\lambda_2$ from the optical signal beam $L_0$ to produce the second light beam $L_2$, such that the optical signal beam $L_0$ is separated into the first light beam $L_1$ and the second light beam $L_2$. Accordingly, the first and second light beams $L_1$ and $L_2$ transmitted via the optical waveguide 1 and separated by the optical filter 5 are respectively received by the first and second photo-detectors 2 and 3 to detect optical signals.

Here, to separate an optical signal, the optical filter apparatus 5 is formed by alternately stacking material layers 6 and 7 with different refractive indices (e.g., layers made of $SiO_2$ and Si) in a multiple layer structure. Here, the thickness of each of the material layers 6 and 7 is determined to be about one fourth of the first wavelength $\lambda_1$. Accordingly, the optical filter 5 can reflect the first light beam $L_1$ of the first wavelength $\lambda_1$ and transmit the second light beam $L_2$ of the second wavelength $\lambda_2$.

Figure 2:
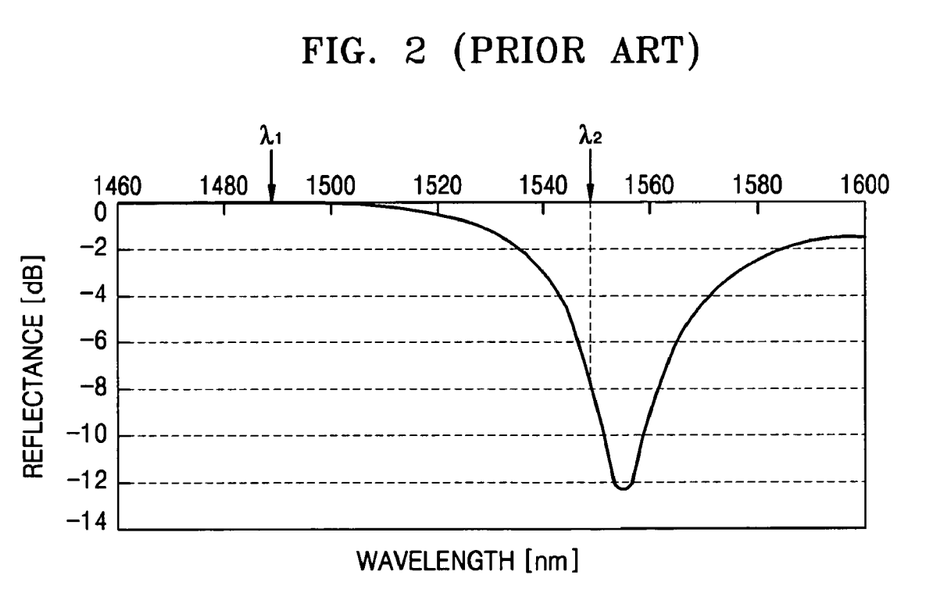
FIG. 2 is a graph illustrating a relationship between reflectance (dB) and wavelength of the optical filter apparatus of FIG. 1.

FIG. 2 is a graph illustrating a relationship between reflectance and wavelength of the optical filter 5 constructed as above.

Referring to FIG. 2, the first wavelength $\lambda_1$ is 1490 nm and the second wavelength $\lambda_2$ is 1550 nm. In the graph, since the reflectance of the light of the first wavelength $\lambda_1$ is 0 dB, the light of the first wavelength $\lambda_1$ is reflected 100% and is not directed to the second photo-detector 3. However, since the reflectance of the light of the second wavelength $\lambda_2$ is greater than approximately −13 dB, about 5% of the light is not transmitted through an incident surface 5a of the optical filter 5 but is reflected to be directed together with the light of the first wavelength $\lambda_1$ to the first photo-detector 2. Accordingly, the light beam of the first wavelength $\lambda_1$ does not affect signal detection by the second photo-detector 3, but the light beam of the second wavelength $\lambda_2$ appears as crosstalk when the first photo-detector 2 detects a signal from the first light beam $L_1$, thereby failing to maintain crosstalk at less than −30 dB required for high quality signal detection.

SUMMARY OF THE INVENTION

The present invention provides an integrated optical filter apparatus, which can be integrated into a miniaturized waveguide and can reduce crosstalk between adjacent signals.

According to an aspect of the present invention, there is provided an integrated optical filter apparatus comprising: a first optical filter reflecting a light beam of a first wavelength and transmitting a light beam of a second wavelength from an externally incident light beam; and a second optical filter facing the first optical filter and reflecting the light beam of the first wavelength reflected by the first optical filter back to the first optical filter, wherein the light beam of the first wavelength is reflected by the first optical filter at least twice to remove noise within the light beam of the first wavelength.

According to another aspect of the present invention, there is provided an integrated optical filter apparatus comprising: an optical filter reflecting a light beam of a first wavelength and transmitting a light beam of a second wavelength from an externally incident light beam; and a reflecting member facing the optical filter and reflecting the light beam of the first wavelength reflected by the optical filter, wherein the light beam of the first wavelength is reflected by the optical filter at least twice to remove noise within the light beam of the first wavelength.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

The present invention will now be described more fully with reference to the accompanying drawings, in which exemplary embodiments of the invention are shown. The described exemplary embodiments are intended to assist the understanding of the invention, and are not intended to limit the scope of the invention in any way.

Figure 3:
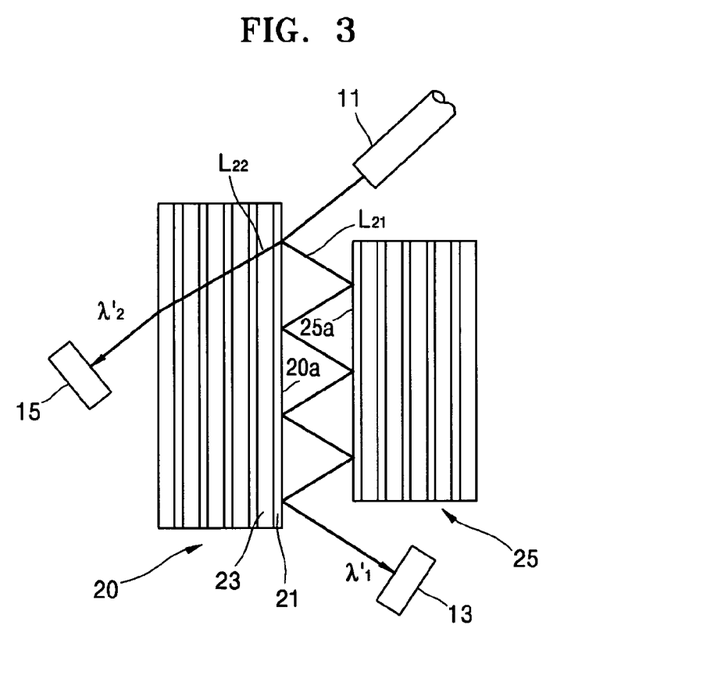
FIG. 3 is a schematic diagram of an integrated optical filter apparatus according to an exemplary embodiment of the present invention.

Referring to FIG. 3, an integrated optical filter apparatus according to an exemplary embodiment of the present invention includes first and second optical filters 20 and 25 facing each other with a space therebetween. The integrated optical filter apparatus of the present exemplary embodiment separates an optical signal beam transmitted via a waveguide 11 into first and second light beams $L_{21}$, and $L_{22}$ having central wavelengths $\lambda_1'$ and $\lambda_2'$ to be respectively received by the a first photo-detector 13 and a second photo-detector 15. Particularly, $\lambda_1'$ denotes the wavelength reflected by the first and second optical filters 20 and 25 and $\lambda_2'$ denotes the wavelength transmitted through the first optical filter 20.

Here, each of the first and second optical filters 20 and 25 is formed by stacking one or more pairs of layers 21 and 23. The paired layers 21 and 23 have different refractive indices, and each of the paired layers 21 and 23 has a thickness of $$\frac{\lambda}{4}(2n-1),$$

where $\lambda$ denotes a central wavelength of each of the light beams reflected by the optical filter and "n" denotes a positive integer.

It is preferable, but not necessary, that the first layer 21 be made of $SiO_2$ and the second layer 23 be made of Si, $SiN_X$ or SiON. Here, which one of the first and second layers 21 and 23 is placed at the top of the other may be changed. If the first layer 21 is made of $SiO_2$ and the second layer 23 is made of Si, $SiN_X$, or SiON, a difference between the refractive indices of the two materials can be increased. Accordingly, even though only a few pairs of first and second layers 21 and 23 are stacked, a reflectance near to 1 for a desired wavelength can be easily obtained. For example, when the first and second layers 21 and 23 are respectively made of $SiO_2$ and Si, a refractive index difference therebetween can be higher than 2.

The first optical filter 20 constructed as above reflects the first light beam $L_{21}$ of the first wavelength $\lambda_1'$ and transmits most of the second light beam $L_{22}$ of the second wavelength $\lambda_2'$ of the light beam emitted from the waveguide 11 and obliquely incident on a first incident surface 20a such that the light beam emitted from the waveguide 11 is separated into the first and second light beams $L_{21}$ and $L_{22}$. Here, the most of the second light beam $L_{22}$ transmitted through the first optical filter 20 is received by the second photo-detector 15. Part of the second light beam $L_{22}$ is reflected by the incident surface 20a of the first optical filter 20 and is directed to the second optical filter 25 along the same path as the reflected first light beam $L_{21}$.

The second optical filter 25 is an optical filter having the same structure as the first optical filter 21, and performs the same function as the first optical filter 21 for the incident first and second light beams $L_{21}$ and $L_{22}$. That is, the first light beam $L_{21}$ reflected by the first optical filter 20 and incident on the second optical filter 25 is totally reflected by a second incident surface 25a of the second optical filter 25 to the first optical filter 20. Meanwhile, most of the second light beam $L_{22}$ incident on the second optical filter 25 is transmitted through the second optical filter 25 and part of the second light beam $L_{22}$ is reflected by the second incident surface 25a of the second optical filter 25 and is directed to the first optical filter 20 along the same path as the first light beam $L_{21}$, reflected by the second incident surface 25a of the second optical filter 25. Since the second light beam $L_{22}$ directed together with the first light beam $L_{21}$ to the second optical filter 25 is removed in this way, the influence of the second light beam $L_{22}$ on the light reception of the first photo-detector 13 can be minimized.

The light beams reincident on the first optical filter 20 are transmitted or reflected according to wavelengths, and the reflected beams are directed to the first photo-detector 13 while the light beam of the second wavelength $\lambda_2'$ is filtered in the space between the first optical filter 20 and the second optical filter 25.

Figure 4:
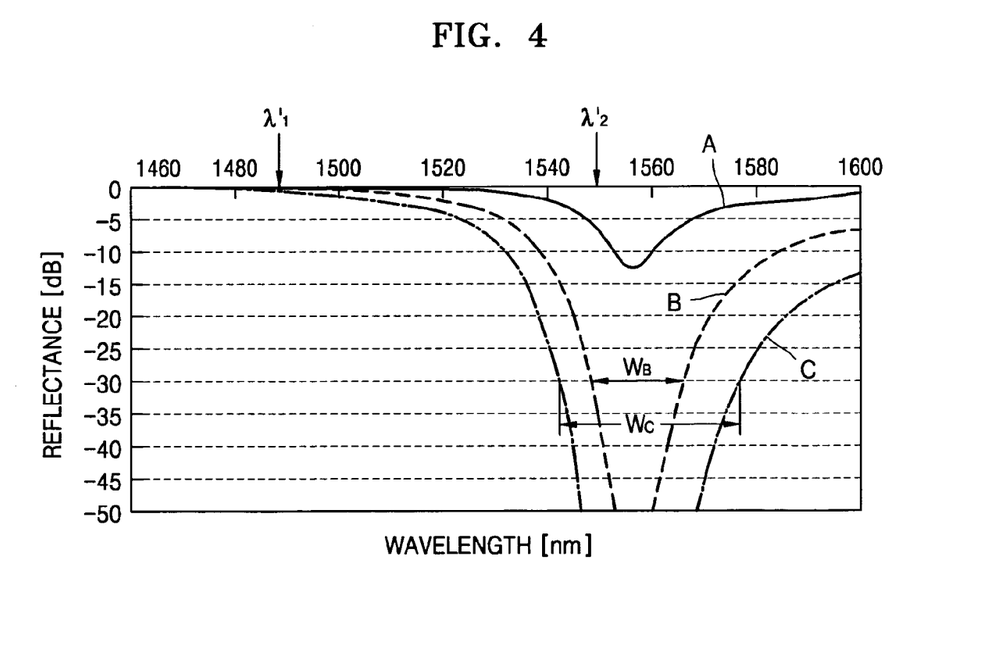
FIG. 4 is a graph illustrating a relationship between reflectance (dB) and wavelength of the integrated optical filter apparatus of FIG. 3.

FIG. 4 is a graph illustrating a relationship between reflectance and wavelength of the integrated optical filter apparatus constructed as above. Referring to FIG. 4, the first wavelength $\lambda_1'$ is 1490 nm, the second wavelength $\lambda_2$ is 1550 nm, segment A represents characteristics of a conventional filter apparatus with no second optical filter 25, segment B represents characteristics of the filter apparatus with the second optical filter 25 when the first light beam $L_{21}$ is reflected five times by the first and second optical filters 20 and 25, and segment C represents characteristics of the filter apparatus with the second optical filter 25 when the first light beam $L_{21}$ is reflected ten times by the first and second optical filters 20 and 25.

Referring to FIG. 4, since the reflectance of the light beam of the first wavelength $\lambda_1'$ is 0 dB and thus the light beam of the first wavelength $\lambda_1'$ is reflected 100%, the light beam is not directed to the second photo-detector 15. Since the conventional optical filter apparatus does not employ the second optical filter, the reflectance of the light beam of the second wavelength $\lambda_2'$ is approximately −13 dB as shown by segment A. However, when the optical filter apparatus employs the second optical filter 25, the reflectance of the light beam of the second wavelength $\lambda_2'$ is much less than −50 dB as shown by segment B and segment C. The light beam of the second wavelength $\lambda_2'$ is transmitted through the first or second optical filter 20 or 25 and is rarely directed to the first photo-detector 13.

Further, when a reflectance standard rarely affected by crosstalk is set to be less than −30 dB required for high quality signal detection, the bandwidth WB including the second wavelength $\lambda_2'$ is approximately 17 nm in case of segment B, and the bandwidth WC including the second wavelength $\lambda_2'$ is approximately 33 nm in case of segment C. Accordingly, noise can be reduced even with a wavelength fluctuation error of the second light beam $L_{22}$ in that bandwidth.

Figure 5:
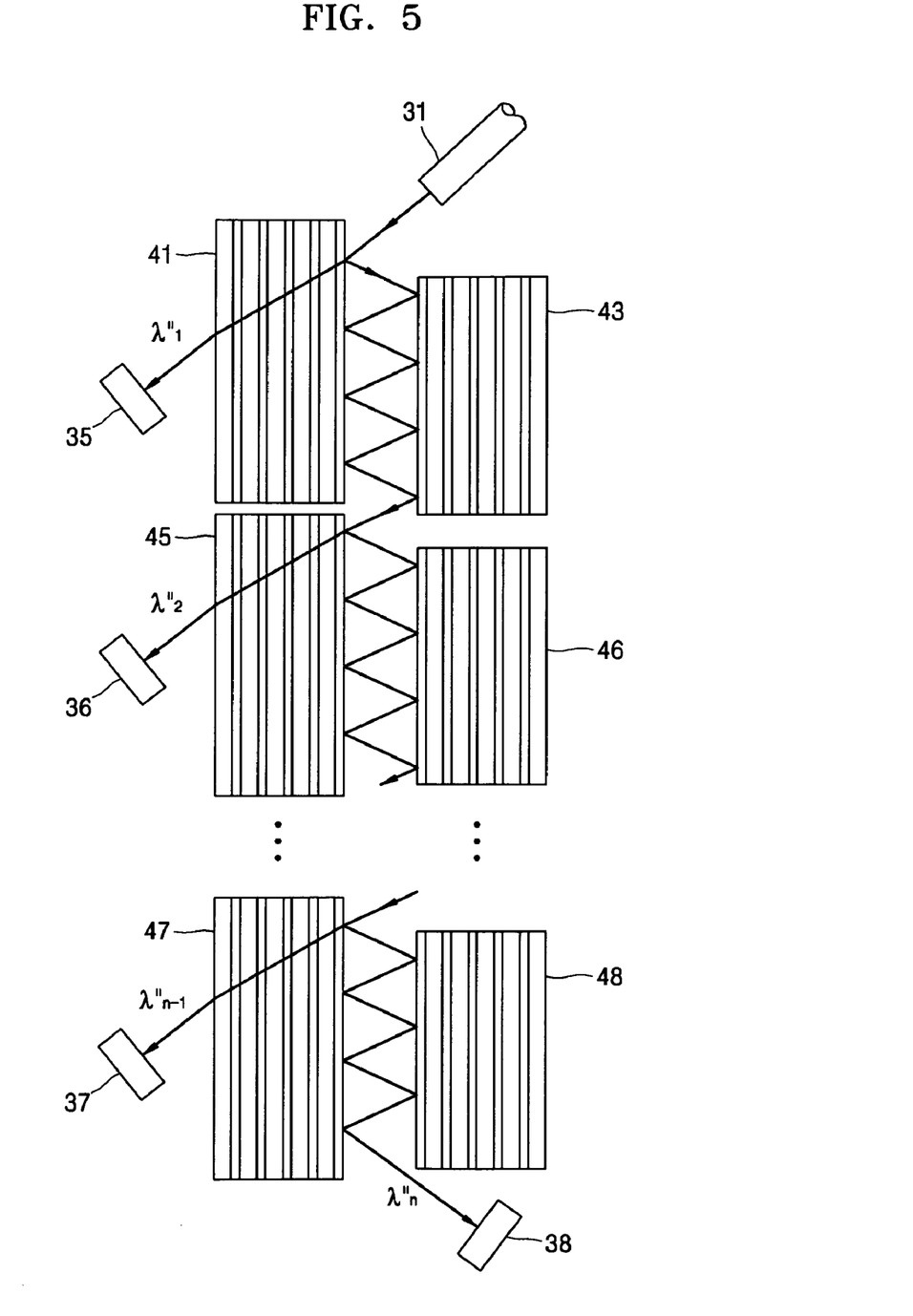
FIG. 5 is a schematic diagram of an integrated optical filter apparatus according to another exemplary embodiment of the present invention.

Referring to FIG. 5, an integrated optical filter apparatus according to another exemplary embodiment of the present invention includes first and second optical filters 41 and 43 facing each other with a space therebetween, and a plurality of additional optical filters 45, 46, 47, and 48. The integrated optical filter apparatus separates an optical signal beam transmitted via a waveguide 31 into light beams respectively having central wavelengths $\lambda_1''$, $\lambda_2''$, ..., $\lambda_{n-1}''$, $\lambda_n''$ to be read by a plurality of photo-detectors 35, 36, 37, and 38.

Since the first and second optical filters 41 and 43 have the same structure and are substantially the same as the first and second optical filters 20 and 25 of the exemplary embodiment illustrated in FIG. 3, a detailed explanation thereof will not be given. Meanwhile, each of the first and second optical filters 41 and 43 transmits most of the light beam of the wavelength $\lambda_1$" and the light beams of other wavelengths to the additional optical filters 45, 46, 47, and 48 which will be described later.

Accordingly, the most of the light beam of the wavelength $\lambda_1$" is transmitted through the first optical filter 41 and is received by the first photo-detector 35, and part of the light beam of the wavelength $\lambda_1$" and the light beams of the other wavelengths are reflected by the first optical filter 41 to the second optical filter 43. Thereafter, most of the light beam of the wavelength $\lambda_1$" of the incident light beams is transmitted through the second optical filter 43, and the light beams of the rest of the wavelengths are reflected to the first optical filter 41. As such reflections are repeated by the first optical filter 41 several times (e.g., four times as shown in FIG. 5), the light beam of the wavelength $\lambda_1$" is transmitted through the first or second optical filter 41 or 43, thereby rarely affecting light signal beams of other wavelengths.

The additional optical filters are added to the optical filter apparatus of the present exemplary embodiment illustrated in FIG. 5 to filter light beams of multiple wavelengths. One or more pairs of additional optical filters are arranged such that each pair of optical filters face each other and correspond in position to the first optical filter 41 and the second optical filter 43.

Referring to FIG. 5, four optical filters 45, 46, 47, and 48 are used as additional optical filters. The third and fourth optical filters 45 and 46 have substantially the same structure as the first and second optical filters 20 and 25 of FIG. 3 of the exemplary embodiment illustrated in FIG. 3, such that the third and fourth optical filters 45 and 46 transmit most of the light beam of the wavelength $\lambda_2$" and reflect other light beams.

Accordingly, most of the light beam of the wavelength $\lambda_2$" is transmitted through the third optical filter 45 and is received by the second photo-detector 36, and part of the light beam of the wavelength $\lambda_2$" and the light beams of other wavelengths are reflected by the third optical filter 45 to the fourth optical filter 46. Thereafter, most of the light beam of the wavelength $\lambda_2$" incident on the fourth optical filter 46 is transmitted through the fourth optical filter 45, and light beams of the other wavelengths are reflected to the third optical filter 45. As such reflections are repeated several times, the light beam of the wavelength $\lambda_2$" is transmitted through the third or fourth optical filters 45 or 46, thereby rarely affecting optical signals of other wavelengths.

As described above, since the plurality of optical filters 47 and 48 are used together with the third and fourth optical filters 45 and 46 as additional optical filters, the incident light beam is separated into a plurality of light beams according to wavelengths to be directed to the respective photo-detectors 37 and 38.

Figure 6:
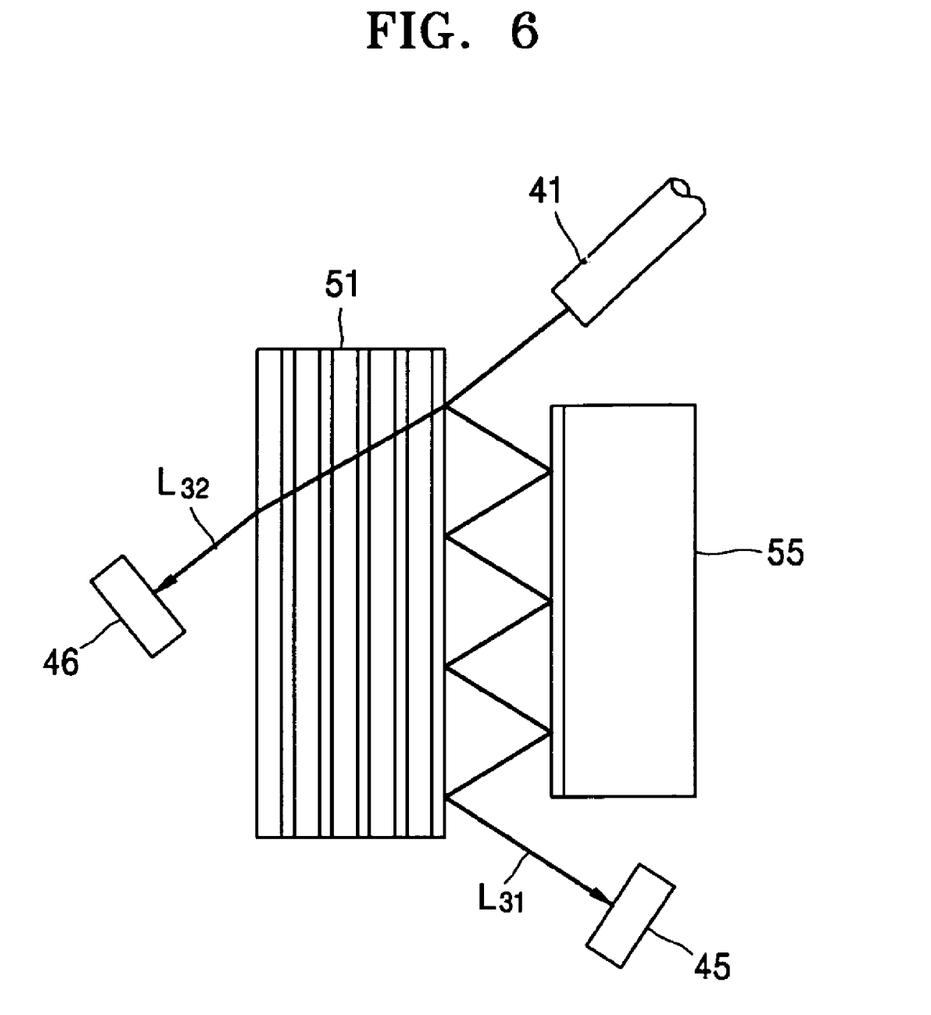
FIG. 6 is a schematic diagram of an integrated optical filter apparatus according to still another exemplary embodiment of the present invention.

Referring to FIG. 6, an integrated optical filter apparatus according to still another exemplary embodiment of the present invention includes an optical filter 51 and a reflecting member 55 facing each other with a space therebetween. The integrated optical filter apparatus of the present exemplary embodiment separates an optical signal beam transmitted via a waveguide 41 into first and second light beams $L_{31}$ and $L_{32}$ having different central wavelengths to be respectively received by a first photo-detector 45 and a second photo-detector 46.

The optical filter 51 having substantially the same structure as the first optical filter 20 of the exemplary embodiment illustrated in FIG. 3 reflects the first light beam $L_{31}$ and transmits the second light beam $L_{32}$ of the incident light beam to separate the incident light beam into the two light beams $L_{31}$ and $L_{32}$.

Here, most of the second light beam $L_{32}$ transmitted through the optical filter 51 is received by the second photo-detector 46. However, part of the second light beam $L_{32}$ is reflected by the optical filter 51 and is directed to the reflecting member 55 along the same path as the reflected first light beam $L_{31}$.

The reflecting member 55 reflects the incident first and second light beams $L_{31}$ and $L_{32}$ to the optical filter 51. Here, the first light beam $L_{31}$ reflected by the reflecting member 55 is totally reflected back to the reflecting member 55 by the optical filter 51. However, most of the second light beam $L_{32}$ incident on the optical filter 51 is transmitted through the optical filter 51, and only part of the incident second light beam $L_{32}$ is reflected to the reflecting member 55 to be directed along the same path as the first light beam $L_{31}$. As such reflections are repeated by the optical filter 51 several times (e.g., four times as shown in FIG. 6), the second light beam $L_{32}$ propagating together with the first light beam $L_{31}$ can be removed. Accordingly, when light is received by the first photo-detector 45, the influence of the second light beam $L_{32}$ can be minimized.

Figure 7:
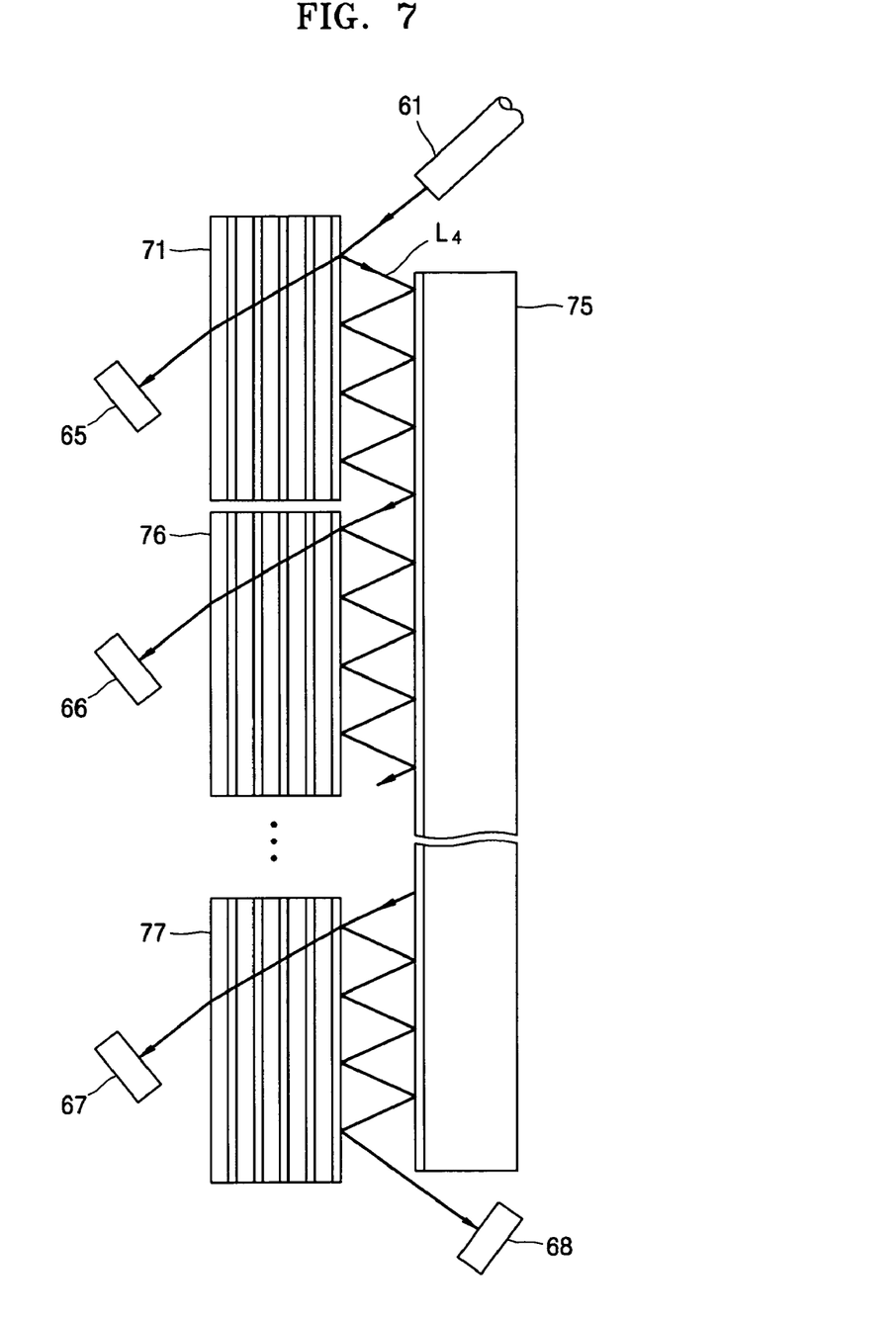
FIG. 7 is a schematic diagram of an integrated optical filter apparatus according to yet another exemplary embodiment of the present invention.

Referring to FIG. 7, an integrated optical filter apparatus according to yet another exemplary embodiment of the present invention includes an optical filter 71 and a reflecting member 75 facing each other with a space therebetween, and at least one pair of additional optical filters 76 and 77. The integrated optical filter apparatus according to the present exemplary embodiment separates an optical signal beam transmitted via a waveguide 61 into a plurality of light beams according to wavelengths to be received by a plurality of photo-detectors 65, 66, 67, and 68.

When compared, the integrated optical filter apparatus illustrated in FIG. 7 is different from the optical filter apparatus illustrated in FIG. 6 in that the reflecting surface of the reflecting member 76 is extended in a direction in which a first light beam $L_4$ of a first wavelength propagates and the at least one pair of additional optical filters 76 and 77 are further provided adjacent to the optical filter 71. However, other elements of the integrated optical filter apparatus illustrated in FIG. 7 are substantially the same as those of the integrated optical filter apparatus illustrated in FIG. 6.

The additional optical filters 76 and 77 have substantially the same structure as the optical filter 71 except the wavelength of light set to be transmitted. Accordingly, since the additional optical filters 76 and 77 are substantially the same as the additional optical filters illustrated in FIG. 5, a detailed explanation thereof will not be given.

Since the reflecting member 75 is longitudinally extended and the at least one pair of additional optical filters 76 and 77 are used as described above, an incident light beam can be separated into at least three light beams according to wavelengths and adjacent light beam components within each separated light beam can be minimized, thereby improving crosstalk performance.

Figure 8:
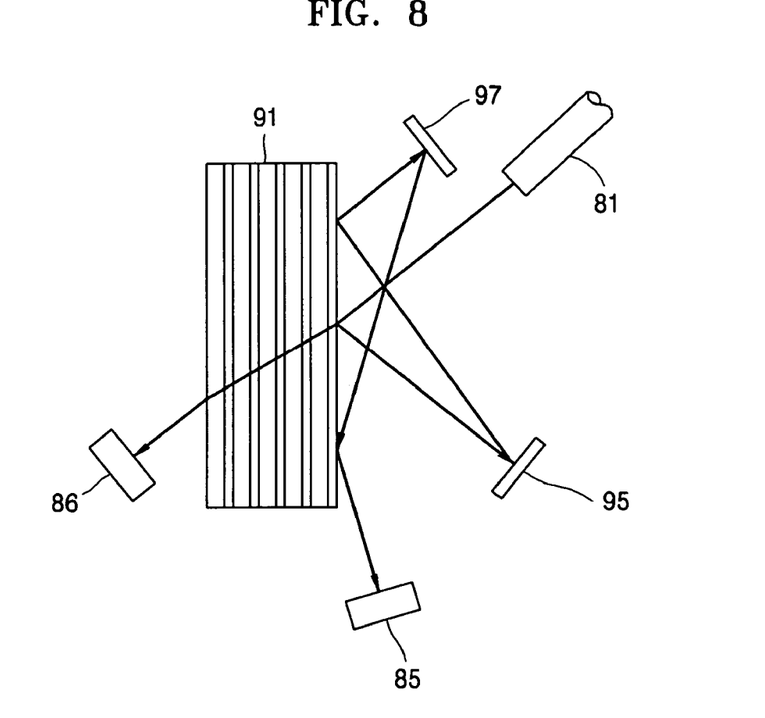
FIG. 8 is a schematic diagram of an integrated optical filter apparatus according to a further exemplary embodiment of the present invention.

Referring to FIG. 8, an integrated optical filter apparatus according to a further exemplary embodiment of the present invention includes an optical filter 91, and a reflecting member consisting of a plurality of mirrors 95 and 97. The integrated optical filter apparatus according to the present exemplary embodiment separates an optical signal beam transmitted via a waveguide 81 into light beams according to wavelengths to be received by first and second photo-detectors 85 and 86.

When compared, the integrated optical filter apparatus of the present exemplary embodiment illustrated in FIG. 8 and the optical filter apparatus of the exemplary embodiment illustrated in FIG. 6 are similar to each other in that the optical filter 91 and the reflecting member are used to reflect an incident light beam at least twice on the incident surface of the optical filter 91, and are different from each other in that the reflecting member consists of the plurality of mirrors 95 and 97.

The mirrors 95 and 97 face the optical filter 91 at different angles, and reflect a light beam reflected at one position of the optical filter 91 to another position of the optical filter 91. Since the mirrors 95 and 97 are arranged in this way, a first light beam is reflected by the incident surface of the optical filter 91 at least twice (e.g., three times as shown in FIG. 8), and then is incident on the first photo-detector 85, thereby making it possible to remove noise within a second light beam.

Figure 9:
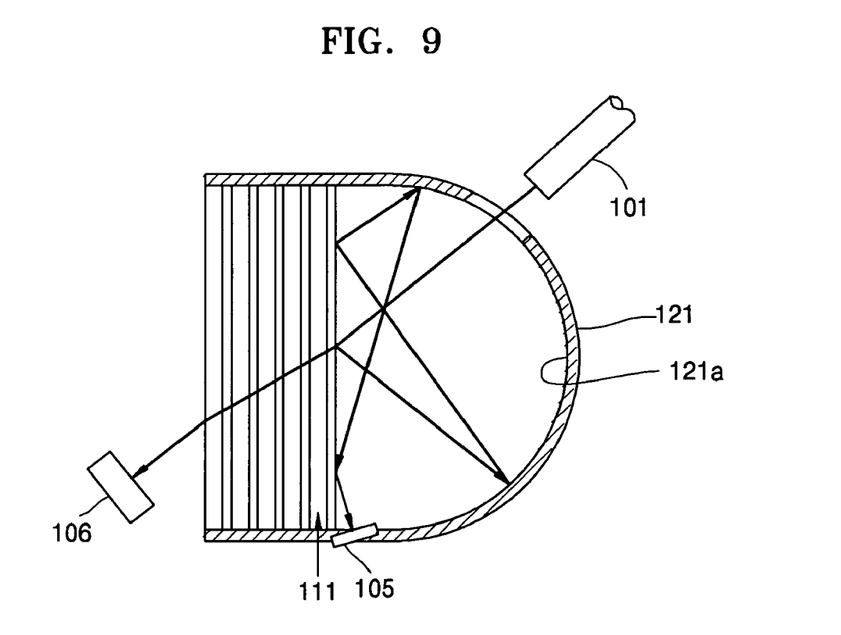
FIG. 9 is a schematic diagram of an integrated optical filter apparatus according to another exemplary embodiment of the present invention.

Referring to FIG. 9, an integrated optical filter apparatus according to another exemplary embodiment of the present invention includes an optical filter 111 and a concave mirror 121. An optical signal beam transmitted via a waveguide 101 is separated into light beams according to wavelengths to be directed to first and second photo-detectors 105 and 106.

When compared, the integrated optical filter apparatus of the present exemplary embodiment illustrated in FIG. 9 and the integrated optical filter apparatus of the exemplary embodiment illustrated in FIG. 6 are substantially the same as each other in that the optical filter 111 and the reflecting member are used to reflect an incident light beam at least twice on the incident surface of the optical filter 111, and are different from each other in that the concave mirror 121 is used as the reflecting member.

The concave mirror 121 is installed at one side of the optical filter 111 to face the optical filter 111, and reflects a first light beam reflected at one position of the optical filter 111 and incident on a reflecting surface 121*a* to another position of the optical filter 111. Since the concave mirror 121 is disposed in this manner, the first light beam can be reflected at least twice (e.g., three times as shown in FIG. 9) by the incident surface of the optical filter 111 and then can be incident on the first photo-detector 105, thereby making it possible to remove noise within a second light beam.

As described above, the integrated optical filter apparatus according to the present invention can be simply manufactured, can be miniaturized, and can also be integrated into a miniaturized waveguide. Since at least two optical filters having the same structure face each other or an optical filter and a reflecting member face each other, a light beam is reflected by the incident surface of the optical filter at least twice, thereby making it possible to remove light beams of other wavelengths within the light beam. Accordingly, low crosstalk less than −30 dB can be easily achieved. In addition, since a wavelength fluctuation width satisfying a reflectance less than −30 dB can be maintained to be over approximately 17 nm, the effect of a wavelength fluctuation error can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An integrated optical filter apparatus comprising:
    a first optical filter reflecting a light beam of a first wavelength and transmitting a light beam of a second wavelength from an externally incident light beam; and
    a second optical filter facing the first optical filter and reflecting the light beam of the first wavelength reflected by the first optical filter back to the first optical filter,
    wherein the light beam of the first wavelength is reflected by the first optical filter at least twice to remove noise within the light beam of the first wavelength.

2. The integrated optical filter apparatus of claim 1, further comprising one or more pairs of additional optical filters, each pair facing each other to correspond in position to the first and second optical filters and separating the light beam reflected by the first and second optical filters into at least two light beams.

3. The integrated optical filter apparatus of claim 2, wherein the first optical filter and the second optical filter have the same structure.

4. The integrated optical filter apparatus of claim 3, wherein each of the first optical filter, the second optical filter, and the additional optical filters includes at least one pair of two layers having refractive indices different from each other, each layer of the pair having a thickness of approximately $$\frac{\lambda}{4}(2n-1)$$

where λ denotes a central wavelength of each of the light beams reflected by the first optical filter, the second optical filter, and the additional optical filters, and n denotes a positive integer.

5. The integrated optical filter apparatus of claim 4, wherein the paired layers are made up of a $SiO_2$ layer and one selected from the group consisting of a Si layer, a $SiN_X$ layer, and a SiON layer formed over or under the SiO2 layer.

6. The integrated optical filter apparatus of claim 1, wherein the first optical filter and the second optical filter have the same structure.

7. The integrated optical filter apparatus of claim 1, wherein each of the first optical filter and the second optical filter includes at least one pair of two layers having refractive indices different from each other, each layer of the pair having a thickness of approximately $$\frac{\lambda}{4}(2n-1)$$

where λ denotes a central wavelength of each of the light beams reflected by the first and second optical filters, and n denotes a positive integer.

8. The integrated optical filter apparatus of claim 7, wherein the paired layers are made up of a $SiO_2$ layer and one selected from the group consisting of a Si layer, a $SiN_X$ layer, and a SiON layer formed over or under the SiO2 layer.

9. An integrated optical filter apparatus comprising:
    an optical filter reflecting a light beam of a first wavelength and transmitting a light beam of a second wavelength from an externally incident light beam; and
    a reflecting member facing the optical filter and reflecting the light beam of the first wavelength reflected by the optical filter back to the optical filter,
    wherein the light beam of the first wavelength is reflected by the optical filter at least twice to remove noise within the light beam of the first wavelength.

10. The integrated optical filter apparatus of claim 9, wherein the reflecting member has a reflecting surface that extends in a direction in which the light beam of the first wavelength propagates, the integrated optical filter apparatus further comprising one or more additional optical filters disposed adjacent to the optical filter to face the reflecting member and separating the light beam reflected by the optical filter into at least two light beams according to wavelengths.

11. The integrated optical filter apparatus of claim 10, wherein each of the optical filter and the additional optical filters includes at least one pair of two layers having refractive indices different from each other, each layer of the pair having a thickness of approximately $$\frac{\lambda}{4}(2n-1)$$

where $\lambda$ denotes a central wavelength of each of the light beams respectively reflected by the optical filter and the additional optical filters, and n denotes a positive integer.

12. The integrated optical filter apparatus of claim 11, wherein the paired layers are made up of a $SiO_2$ layer and one selected from the group consisting of a Si layer, a $SiN_x$ layer, and a SiON layer formed over or under the SiO2 layer.

13. The integrated optical filter apparatus of claim 9, wherein the reflecting member comprises a plurality of mirrors facing the optical filter at different angles and reflecting the light beam of the first wavelength reflected at one position of the optical filter to another position of the optical filter.

14. The integrated optical filter apparatus of claim 9, wherein the reflecting member is a concave mirror installed at a side of the optical filter to face the optical filter and reflecting the light beam of the first wavelength reflected at one position of the optical filter to another position of the optical filter.

15. The integrated optical filter apparatus of claim 9, wherein the optical filter includes at least one pair of two layers having refractive indices different from each other, each layer of the pair having a thickness of approximately $$\frac{\lambda}{4}(2n-1)$$

where $\lambda$ denotes a central wavelength of each of the light beams reflected by the optical filter, and n denotes a positive integer.

16. The integrated optical filter apparatus of claim 15, wherein the paired layers are made up of a $SiO_2$ layer and one selected from the group consisting of a Si layer, a $SiN_x$ layer, and a SiON layer formed over or under the SiO2 layer.

\* \* \* \* \*